（12）United States Patent
Kagan et al.

(10) Patent No.: US 8,196,144 B2
(45) Date of Patent: Jun. 5, 2012

(54) SYSTEM AND METHOD FOR ACCELERATING INPUT/OUTPUT ACCESS OPERATION ON A VIRTUAL MACHINE

(75) Inventors: Michael Kagan, Zichron Yaakov (IL);
Dror Goldenberg, Zichron Yaakov (IL);
Benny Koren, Zichron Yaakov (IL);
Michael Tsirkin, Yokneam Yllit (IL)

(73) Assignee: Mellanox Technologies Ltd, Yokneam (IL)

( * ) Notice: Subject to any disclaimer, the term of this patent is extended or adjusted under 35 U.S.C. 154(b) by 185 days.

(21) Appl. No.: 12/699,894

(22) Filed: Feb. 4, 2010

(65) Prior Publication Data
US 2010/0138840 A1    Jun. 3, 2010

Related U.S. Application Data

(62) Division of application No. 11/208,528, filed on Aug. 23, 2005.

(51) Int. Cl.
*G06F 9/46* (2006.01)
(52) U.S. Cl. ....................................... 718/104
(58) Field of Classification Search .......... None
See application file for complete search history.

(56) References Cited

U.S. PATENT DOCUMENTS

| | | | |
|---|---|---|---|
| 7,003,771 B1 * | 2/2006 | Arndt | 718/104 |
| 7,237,016 B1 * | 6/2007 | Schober | 709/223 |
| 2004/0128469 A1 * | 7/2004 | Hall et al. | 711/207 |
| 2006/0294518 A1 * | 12/2006 | Richmond et al. | 718/1 |

OTHER PUBLICATIONS

InfiniBand Architecture Specification, Release 1.0, Oct. 2000, pp. 1-884.
Advanced Power Virtualization on IMM @server p5 servers, Sep. 27, 2004, pp. 1-230.

* cited by examiner

*Primary Examiner* — Emerson Puente
*Assistant Examiner* — Gregory Kessler
(74) *Attorney, Agent, or Firm* — Mark M Friedman

(57) ABSTRACT

A system and method for accelerating input/output (IO) access operation on a virtual machine, The method comprises providing a smart IO device that includes an unrestricted command queue (CQ) and a plurality of restricted CQs and allowing a guest domain to directly configure and control IO resources through a respective restricted CQ, the IO resources allocated to the guest domain. In preferred embodiments, the allocation of IO resources to each guest domain is performed by a privileged virtual switching element. In some embodiments, the smart IO device is a HCA and the privileged virtual switching element is a Hypervisor.

7 Claims, 8 Drawing Sheets

SYSTEM AND METHOD FOR ACCELERATING INPUT/OUTPUT ACCESS OPERATION ON A VIRTUAL MACHINE

This is a Divisional of pending U.S. patent application Ser. No. 11/208,538, filed Aug. 23, 2005.

FIELD OF THE INVENTION

The present invention relates generally to computer systems, and more specifically to a virtual environment computer architecture that enables direct configuration and control of input/output (IO) resources by guest domains.

BACKGROUND OF THE INVENTION

Packet network communication adapters are a central element in new high-speed, packetized, serial IO bus architectures that are gaining acceptance in the computer industry. In these systems, computing hosts and peripherals are linked together by a switching network, commonly referred to as a switching fabric, taking the place of parallel buses that are used in legacy systems. A number of architectures of this type have been proposed, culminating in the "InfiniBand™" (IB) architecture, which is described in detail in the *InfiniBand Architecture Specification*, Release 1.0 (October, 2000), which is incorporated herein by reference. This document is available from the InfiniBand Trade Association at www.infinibandta.org. A host connects to a switching fabric (e.g. the IB fabric) via a host channel adapter (HCA).

Computer system virtualization is known. It allows multiple operating systems and processes to share the hardware resources of a host computer. The system virtualization infrastructure provides resource isolation so that each guest operating system (OS) does not realize that it is sharing resources with another OS and does not adversely affect the execution of the other OS. Such system virtualization enables applications including server consolidation, co-located hosting facilities, distributed web services, applications mobility, secure computing platforms and other applications that provide for efficient use of underlying hardware resources. However, the existing, known virtualization is exclusively implemented in software (SW).

FIG. 1a shows schematically a virtualized server 100 comprising a hardware (HW) section IO device 102, guest domains 104, CPU and memory functions 106 and at least one virtual switching element having isolation and load balancing functions (also referred to throughout the description as a "privileged virtual switching element", exemplarily a "Hypervisor") 108 interconnected as shown. Hypervisor is described in detail in, for example, the Xen open source implementation available at www.xensource.com, or in the IBM Redbook publication "Advanced Power Virtualization on IMM @server p5 Servers", Sep. 27, 2004. In prior art before InfiniBand, all IO accesses (both datapath and control) had to go through the Hypervisor SW layer. In FIG. 1a, the thick full lines illustrate datapath access, while the thin full ones illustrate control access. The necessity to go through SW for every IO access adversely affects performance and increases the demands on a CPU. The InfiniBand channel architecture solves the problem only partially, enabling direct IO access on the datapath IO operations (see below).

The IO device may exemplarily be a HCA, to which the description refers henceforth in detail. However, it should be clear that the present invention applies equally well to other IO devices, for example IO devices in architectures such as Ethernet, Fiber Channel, TCP/IP, etc. "HCA" is thus used throughout the description as representing any smart IO device with functionality as described, while Hypervisor is used throughout the description as representing any virtual switching element with functionality as described.

An exemplary HCA is shown in FIG. 1b. It comprises a command queue (CQ) 120 and a plurality (up to 16M) of data queues (DQ) 122. The CQ is used to set policies, i.e. access rights and restrictions to use the HCA resources (queue pairs, translation tables, etc) to access a network directly from the application. The data queues implement IO channels to access the IO device. The multiple HCA resources (work queues) are used to execute datapath operations and to implement cross-queue isolation and protection. The protection and isolation policy is set by a single control entity (CQ) owned by a privileged driver. There is therefore a single "control interface" to configure resources and multiple control interfaces to use them.

In SW virtualization as provided by prior art, each OS becomes a "non-trusted" instance and therefore every IO access goes through the privileged entity (e.g. Hypervisor), which validates access rights. There is no direct access of a guest domain to the IO mechanism. As a result, there are multiple (and not one) kernel transitions for IO access on behalf of an application running on a guest (virtualized) server. In addition, Hypervisor implements a "virtual network" in software to enable cross-domain communication and isolation of different domains. The issue here is not only trust, but also resource management and isolation. The guest domain is not aware of his fellow domains using the same resources. Hypervisor allocates resources per domain and (in absence of HW aids) also enforces this allocation. In order to do the latter, it is involved in every IO operation. While using the HCA, Hypervisor can set up policies and the HCA HW will enforce them. The datapath operation can also be off-loaded to Hypervisor with a 'standard" HCA, but since control operations become too heavy, this solution is inefficient.

FIG. 1c shows a prior art non-virtual server environment, in which a HCA 102 is being accessed directly for both control and datapath operations from a domain (server) 130.

An InfiniBand HCA device driver in a virtualized server is different from a driver in a non-virtualized server. With IB, the datapath accesses can go directly to the IO device, while the control still goes through Hypervisor. InfiniBand defines access to hardware for IO access on the datapath, and isolation and protection is a part of its specification. Thus, a standard-compliant InfiniBand HCA enables exporting an IO channel for data transfer to each operating system, off-loading this "virtual network" from Hypervisor to the HCA HW. Since some control operations (e.g. memory registration) are performance-critical, this solution does not solve the entire problem of IO access from a guest domain, and part of the IO access operation has to go in software through Hypervisor. Such a software based approach has two drawbacks:

1. All control operations on behalf of the application in the guest domain must be done in Hypervisor, which incurs kernel transitions, and:

2. The InfiniBand SW (driver) running in the guest domain must be changed to run datapath operations directly to the HW, while for control operations it must generate a call to Hypervisor The first drawback has performance implications, since going through multiple kernel transitions is prohibitive. The second drawback does not enable to run the same OS distribution on non-virtualized and virtualized servers.

There is therefore a widely recognized need for, and it would be highly advantageous to have a hardware based solution that enables acceleration of IO access operations on a virtual machine, while reducing CPU load. It would furthermore be advantageous to enable a guest domain to execute control (and not only datapath) operations by direct access to hardware.

SUMMARY OF THE INVENTION

According to the present invention there is provided a method for accelerating IO access operation on a virtual machine comprising the steps of providing a smart IO device that includes an unrestricted CQ and a plurality of restricted CQs and allowing a guest domain to directly configure and control IO resources through a respective restricted CQ, the IO resources allocated to the guest domain through the unrestricted CQ.

According to the present invention there is provided a method for accelerating input/output access operation on a virtual machine comprising the steps of, in a smart IO device, providing a plurality of restricted CQs, each associated with a respective guest domain, and using a Hypervisor, allocating partial IO resources to each restricted CQ, whereby each guest domain may directly configure and control its respectively allocated IO resources through its associated restricted CQ while being isolated and protected from other guest domains.

According to the present invention there is provided a system for accelerating IO access operation on a virtual machine comprising a smart IO device that includes an unrestricted CQ and a plurality of restricted CQs, each restricted CQ operative to be associated with a respective guest domain; and a configuring function operative to allocate partial IO resources to each guest domain, whereby the system enables each guest domain to directly configure and control IO resources, while being isolated and protected from all other guest domains accessing the virtual machine through the smart IO device.

According to the present invention there is provided a system for accelerating IO access operation on an InfiniBand virtual machine comprising a smart IO device comprising a CQ creation function, the CQ creation function operative to create CQs that can be exported to a guest OS, enabling the guest OS to run unmodified InfiniBand software.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE PREFERRED EMBODIMENTS

Figure 1A:
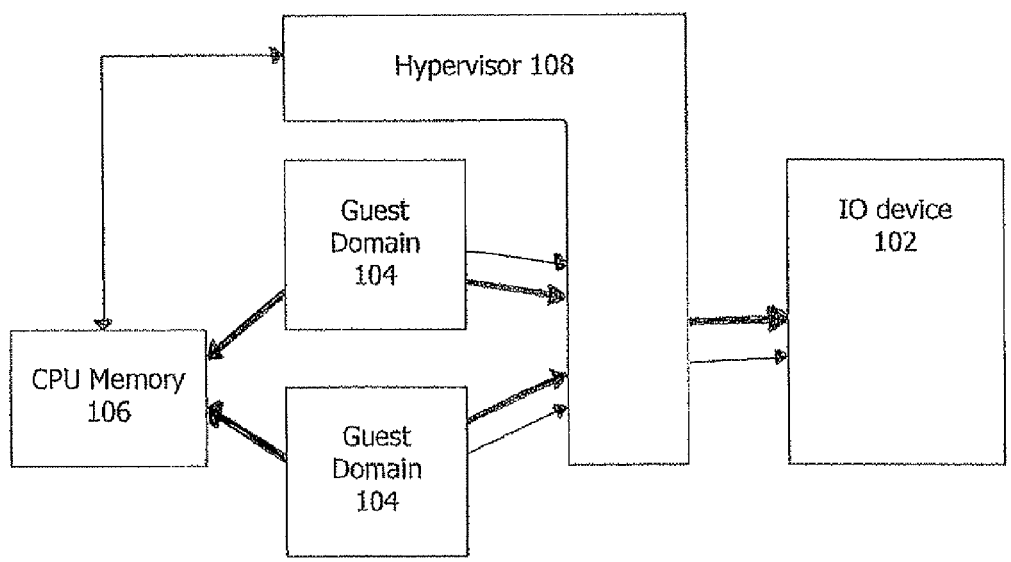
FIG. 1a shows schematically a prior art virtualized server.
Figure 1B:
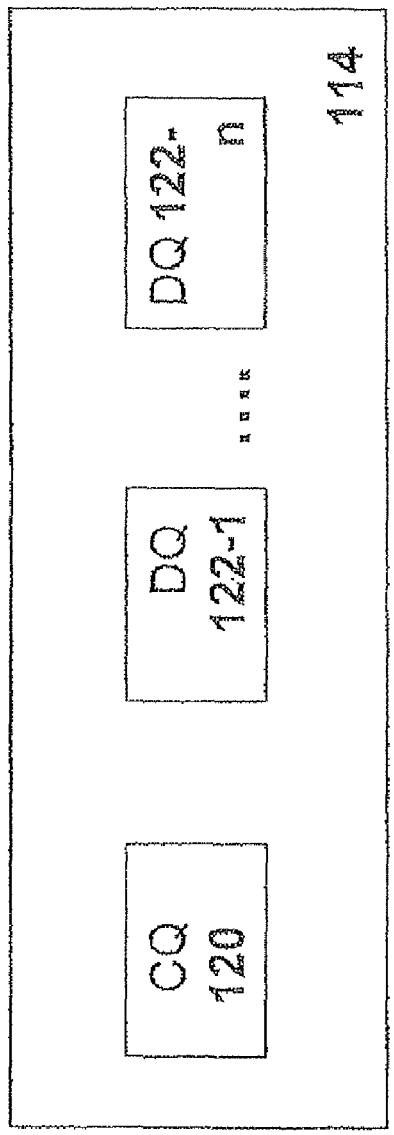
FIG. 1b shows schematically details of a prior art HCA.
Figure 1C:
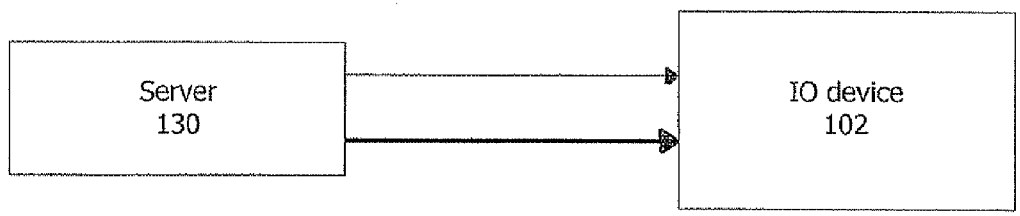
FIG. 1c shows schematically prior art IO access from a non-virtualized server

The present invention relates to a system and method for accelerating input/output access operation on a virtual machine. It allows a guest domain to execute control (and not only datapath) operations by direct access to hardware and represents a novel HW implementation of virtualization. The following description uses a HCA as an exemplary smart IO device, and Hypervisor as an exemplary virtual switching element. However, as mentioned, the present invention is meant to encompass other IO devices and other virtual switching elements used or operating in various architectures and/or protocols such as Ethernet, Fiber Channel, TCP/IP, if such IO devices and virtual switching elements include one or more of the inventive features described herein. With virtualization support as provided herein, a HCA enables to have multiple entities that may each independently configure a subset of HCA resources to be subsequently used by applications. In essence, the present invention allows a guest to use a HCA in a virtualized environment the same way as the usage today in a non-virtualized environment represented by FIG. 1e.

The present invention addresses the two drawbacks of SW virtualization solutions mentioned in the Background (before and after IB) and presents a solution that overcomes these drawbacks. The present invention allows both datapath and performance-critical control operation access from a guest domain directly to the IO device. The same driver that runs in a non-virtualized server can run now also in a virtualized server. The solution is achieved by implementing the following functions in a smart HCA integrated chip (i.e. in hardware):

1. A command queue (CQ) creation (configuration) function that creates command queues that can be exported to the guest OS, so that the guest OS is able to run unmodified SW (e.g. InfiniBand SW). A separate CQ is assigned to each guest domain, the type of configuration that can be done through each CQ is specified, and non-allowed commands are proxied to Hypervisor with results returned to the guest OS.

2. An address translation and validation function. IO address translation functions per-se exist today in some bridge devices (called IO memory management unit or MMU). However, the present invention provides an on-chip capability that enables to offload Hypervisor in systems that do not include IO MMU functionality in the chipset. The smart HCA implements an additional stage in the address translation process to validate and translate the physical address given by the guest OS to a true HW physical address Some control operations generated by a guest domain (e.g. HCA shut-down, fabric management etc.) must be validated (and sometimes executed) by Hypervisor. The smart HCA HW of the present invention is capable of proxying such an operation for execution in Hypervisor, and return the result of the execution to the guest domain. In essence, the invention enables guest domains to access an IO device for performance-critical control operations. Advantageously, it also enables use of the same IO device driver that runs on a non-virtual server to run on a virtual server. Moreover, in contrast with prior art HCA, in which there is a single control entity and multiple data queues, the present invention provides multiple control interfaces, each operative to configure a subset of resources.

Figure 2:
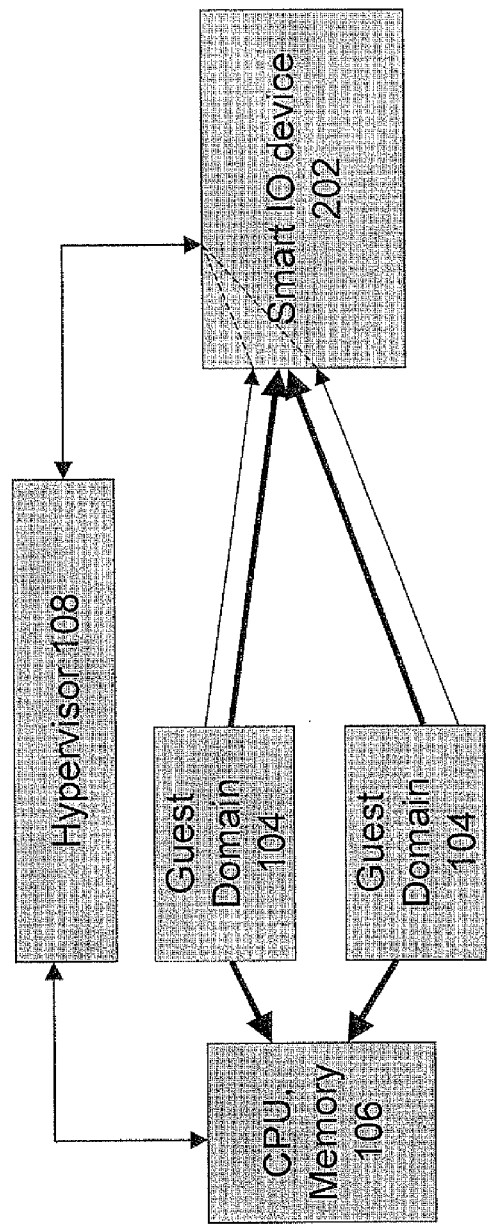
FIG. 2 shows schematically a preferred embodiment of a system of the present invention for accelerating input/output access operation on a virtual machine.

FIG. 2 shows schematically a preferred embodiment of a system 200 of the present invention for accelerating input/output access operation on a virtual machine. System 200 comprises the same elements as system 100, except that the IO device is a smart IO device 202 with upgraded functionality. In inventive contrast with prior art as exemplified by system 100, each guest domain in FIG. 2 may communicate directly with smart IO device 202, in addition to communication through Hypervisor 108. The thick full lines illustrate datapath access, while the thin full lines illustrate control access. The dotted lines illustrate proxying of control operations by the HCA to Hypervisor. Some operations will be executed by the HCA HW according to a command given by the guest domain. A policy set up for each CQ while it is created may determine which operations are to be proxied and which can be executed directly.

Figure 3:
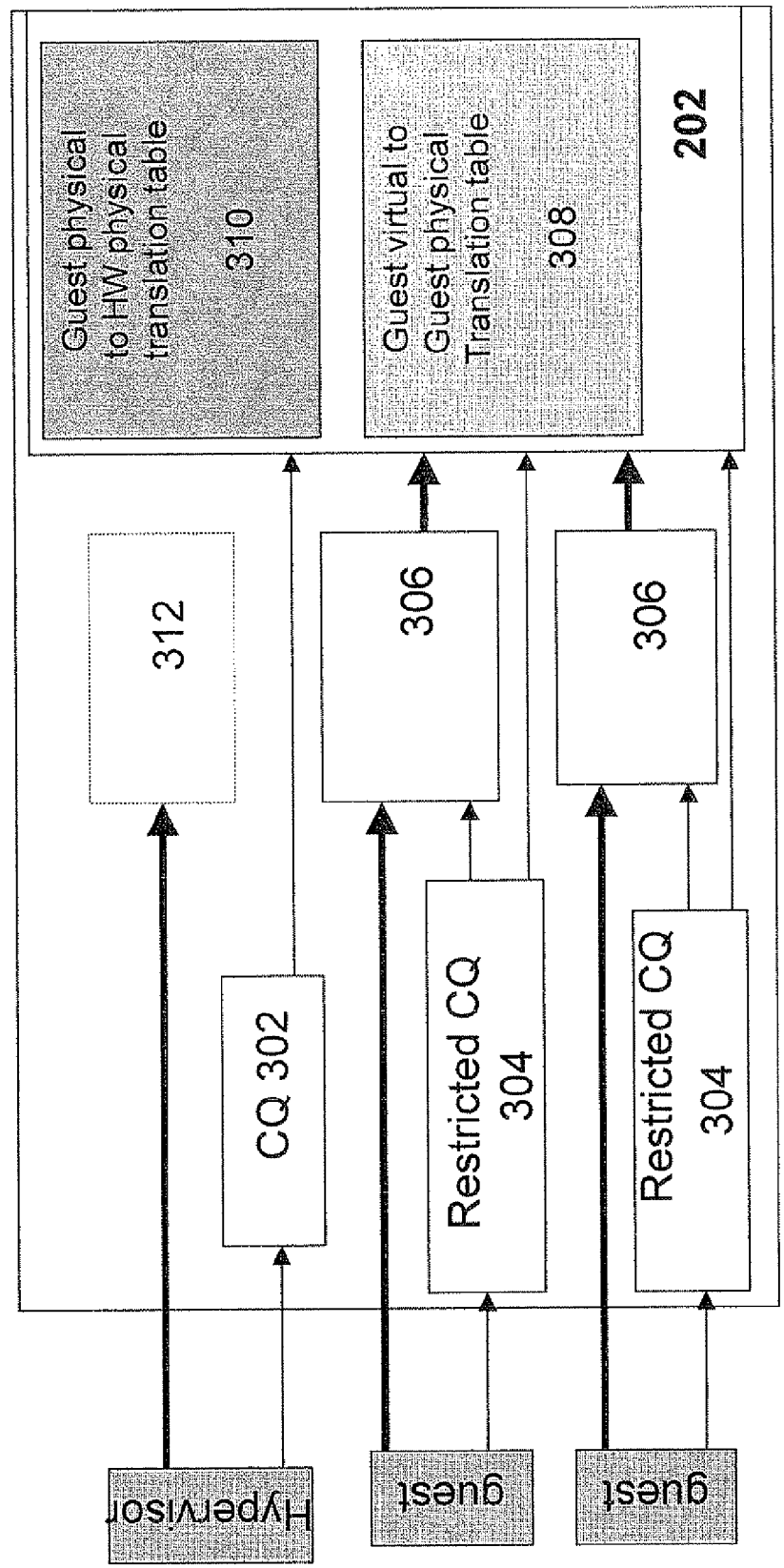
FIG. 3 shows in more detail a smart HCA of the present invention.

FIG. 3 shows in more detail a smart HCA 202 of the present invention. The smart HCA includes an unrestricted command interface (queue) 302 owned by Hypervisor, and used to set up policies and allocate HCA resources between domains. HCA 202 further comprises multiple (at present up to 128) restricted command queues 304 that are exported to the guest domains. Each CQ 304 has data queues 306 and other HCA resources (that include exemplarily guest virtual to guest physical translation tables 308 and address spaces and protection domains (not shown). HCA 202 further comprises guest physical to HW physical translation tables 310, which are associated with, but not owned by a guest domain. The association of restricted command queues with resources is done by Hypervisor. HCA 202 further comprises data queues 312 that can be used by Hypervisor (e.g. Hypervisor can execute IO operations on its own, independently of IO operations by other domains).

Data queues 306 are configured by the CQ configuration function, which, as mentioned, is operative to create restricted CQs that can be exported to each guest OS or domain. The address translation and validation function is operative to perform a two step operation: translate a guest virtual address into a guest physical address, and translate a guest physical address to a machine (HW) address (registering memory with the HCA to a HW physical address). The second step represents a new and novel functionality added by this invention. The CQ configuration function also validates that the physical address given by the domain is mapped and enabled for IO access. In this operation, the HCA implements an additional stage in the address translation process to validate and translate the physical address that was given by the guest OS to the HW physical address In summary, the smart HCA now comprises internally the original CQ plus a plurality of new restricted CQs, each identified with a specific guest domain The smart HCA has now, in a sense, as many translation tables as the number of guest domains, instead of having a single translation table. In addition, there is a new guest-associated part of the translation table owned by Hypervisor, which contains translations of guest physical addresses to HW addresses. Further, there is a new operation (step) in the address translation process, where the HCA takes a guest physical address and translates it again to a HW address, instead of using the result of the first translation (of a guest virtual address into a guest physical address) for memory access.

The "restricted" attribute of the restricted CQs, which are separate and unique for each guest domain, indicates that they have limited privilege. Exemplarily, restricted CQs are forbidden to (and in fact cannot) control some machine functions, such as HCA resources allocated to other domains. They cannot also control a physical machine state (e.g. "take link down") that serves other domains. The cross domain protection is implemented through these restrictions.

Figure 4:
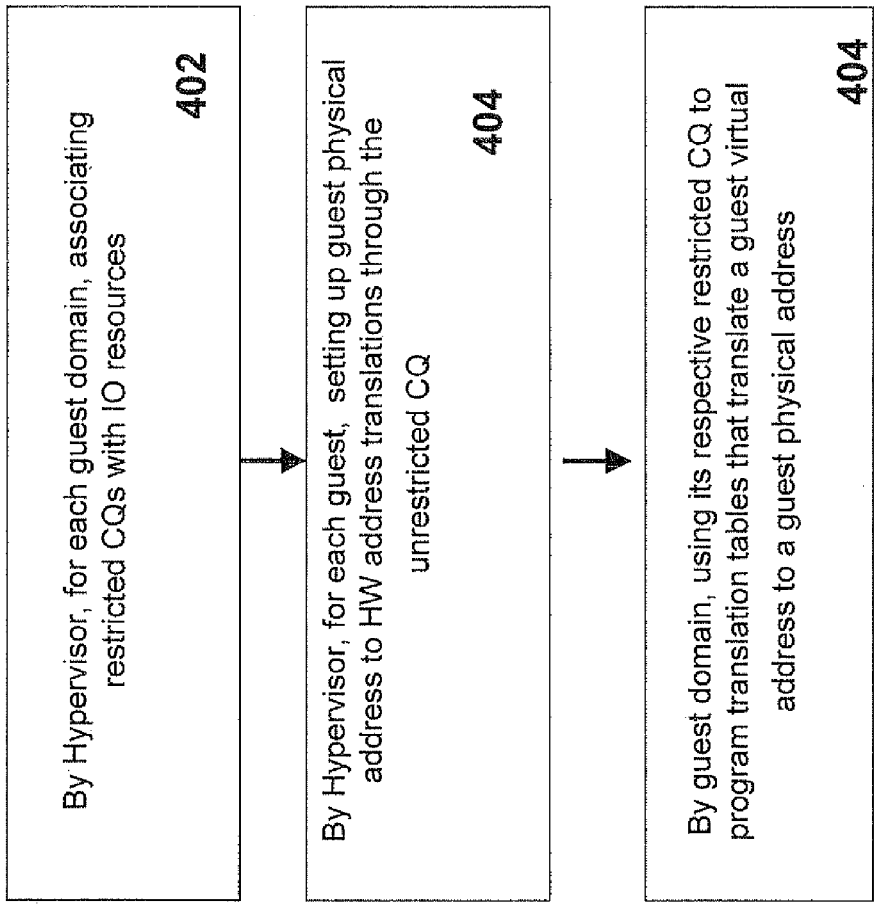
FIG. 4 shows schematically a flow chart of the two major basic steps in the method of the present invention.

FIG. 4 shows schematically a flow chart of the major basic steps in the method of the present invention. In step 402, restricted CQs are associated with IO resources and exported to the guest domain by Hypervisor. From the guest OS perspective, this action is like discovering a real HW. Alternatively, the export may be actually done while booting the guest domain or as a 'hot plug" event while the guest domain is running (emulating a hot-plug of a card insertion on a non-virtualized server) Hypervisor sets up guest physical address to HW address translations through the unrestricted CQ in step 404. Each guest domain then uses its respective restricted CQ to program translation tables that translate a guest virtual address to a guest physical address in step 406. This is used in a "second hop" of the address translation process.

Note that in a virtual machine environment, an address that is perceived by the guest domain as "physical" (and which will be programmed to the HCA by the guest domain driver) is not a true HW physical address. The HCA driver configures physical addresses to be accessed in the HCA. The HW physical address is managed by Hypervisor. The HCA looks up the respective translation table for every memory access. After the initial configuration (e.g. physical addresses allocated to a guest domain are programmed to "special" translation pages, CQ-allocated, queues are allocated for that particular CQ, etc.), Hypervisor exports this part of the HCA to the guest domain (which, in turn, will think that it has its own HCA).

Note also that the physical memory allocation on the host is done during the domain boot. The initial programming of HCA tables to translate from a guest physical address to a HW address can be done also at boot or "on demand", i.e. while IO operation traps with error to Hypervisor. The difference between "initial" or "on-demand" programming is related to whether HCA translation tables are updated before or after an application actually attempted to use these pages. The latter is sometimes handy, as it is a natural filtering of pages that really needs to be mapped for IO access.

Figure 5:
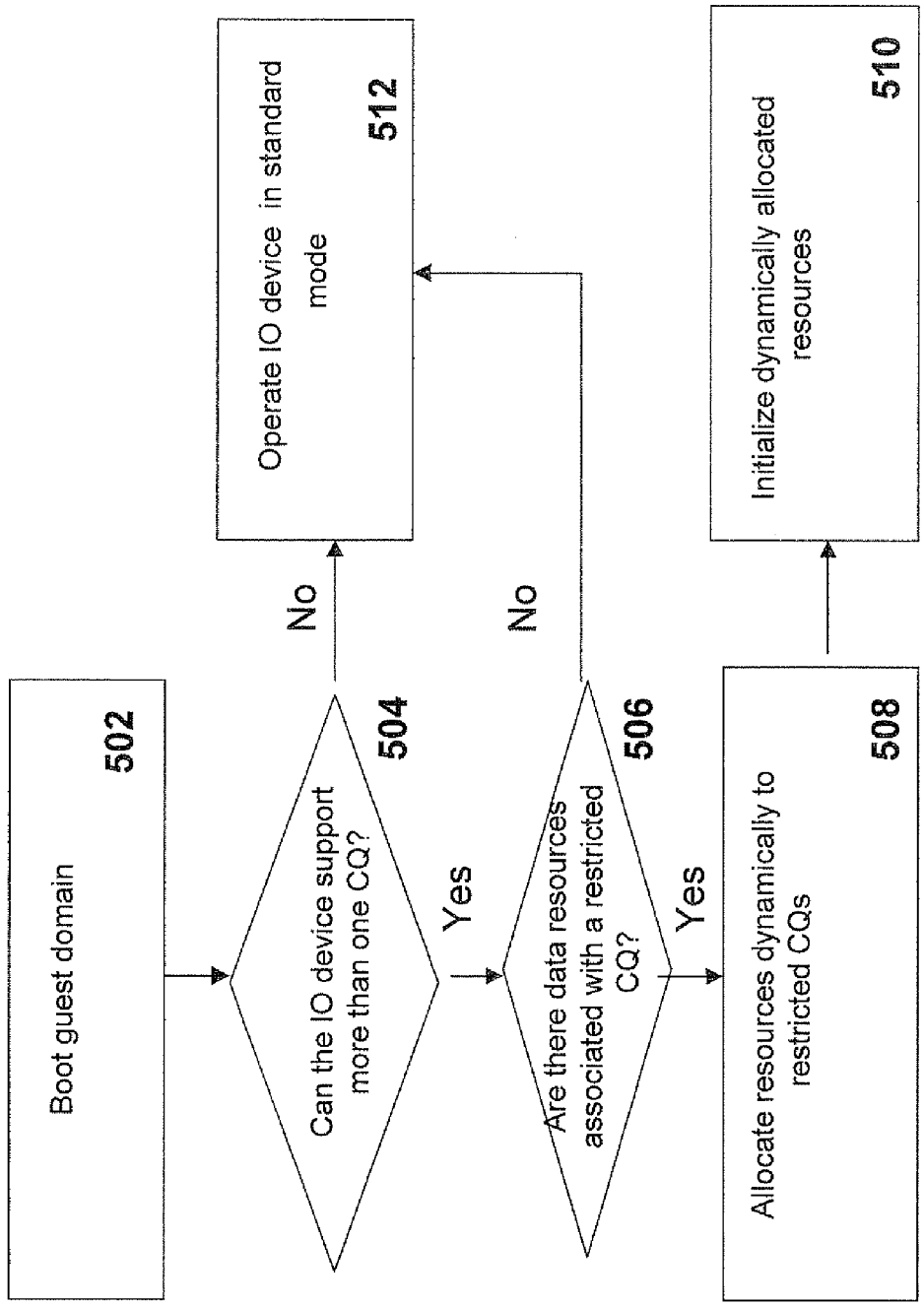
FIG. 5 shows a detailed flow chart of the allocation step in the method of FIG. 4.

FIG. 5 shows a detailed flow chart of allocation step 402. A guest domain boots by Hypervisor in step 502. In step 504, the HCA is checked by Hypervisor to see if it is "smart", i.e. whether it can support one additional command queue. If yes, in step 506 Hypervisor checks whether data resources to be associated with each such additional CQ are available. If such resources are found ("yes"), they are allocated to each CQ in step 508. The resources are initialized in step 510, and the guest domain uses the HCA as if it is running on a non-virtual server.

If the check result in step 504 is "no", the system will use a prior art mode of operation and all IO access operations—data and control—will go through Hypervisor as done in prior art in step 512. If the check result in step 506 is "no", the operation also goes to step 512. In alternative embodiments, steps 504 and 506 may be merged into one step.

Figure 6:
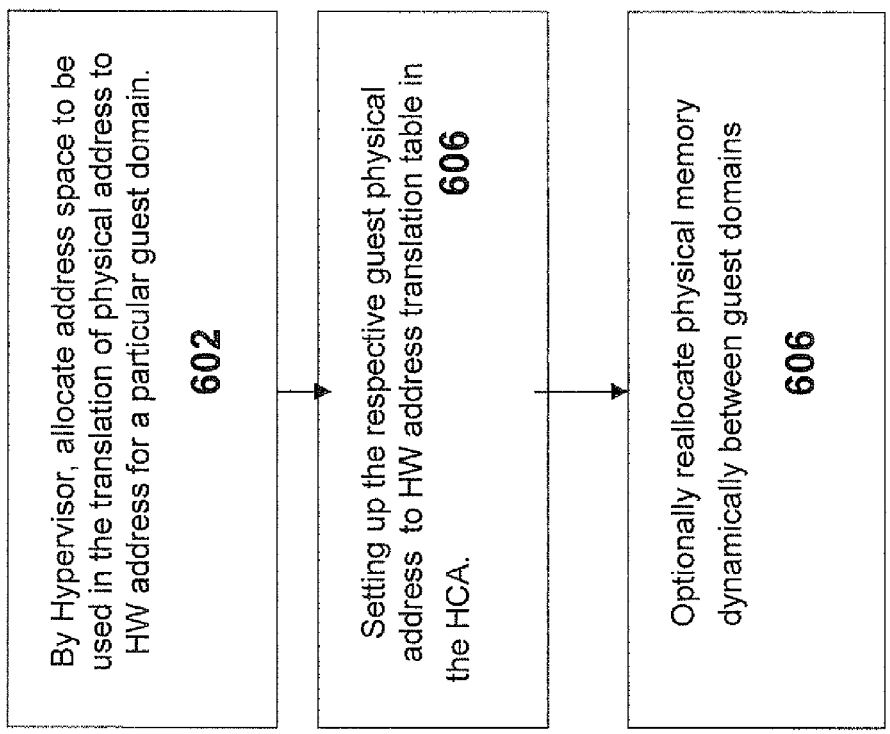
FIG. 6 shows a detailed flow chart of the translation table configuration step in the method of FIG. 4

FIG. 6 shows details of actions in an exemplary step 404. Hypervisor allocates a physical address on the server for each guest domain, provides the guest domain with a "virtual physical address space" and sets up a HCA translation table to translate from the "virtual physical" address to an HW physical address in step 602. The guest PA to HW address translation tables in the HCA are set up in step 604. This process can happen dynamically (during the server operation). The guest domain can register its buffer with the HCA for the IO access by applications running in that domain providing the "virtual physical address" to the HCA, and the HCA will translate this "virtual physical" address to the HW physical address prior to accessing memory. In alternative embodiments, physical memory allocated to one domain is dynamically reallocated between guest domains in step 606. That is, the physical memory allocated to one domain can be moved to another in the life of the server. The smart HCA enables to dynamically re-allocate physical memory between the guest domains e.g.

HCA enables updates of these "virtual physical" to "HW" address translation tables at runtime.

EXAMPLE

The example refers to a non-virtual server environment. One of the typical and performance-critical IO operations is reading data from a disk. The way a SW stack is structured in the operating systems (Linux, Windows, Unix, Solaris, etc.) is that the block storage access mid-layer provides a list of pages specified by their physical addresses to the block storage server (SCSI) interface. At this point, a SCSI network driver sends this list of pages to the target (disk) so the disk controller will read data from the disk and write to pages specified. Typically—in order to reduce number of write operations by the disk controller—an SCSI initiator driver creates a single (new) virtually contiguous address space, which includes all the pages specified by the block storage access mid-layer and sends a single (virtual) address to the disk to be used to write the data. This address space is programmed in a HCA by the SCSI driver. When the disk issues a write operation, it uses a virtual address in the request packet. The HCA translates this virtual address to physical addresses programmed by the SCSI driver and writes data to memory.

In a virtual server environment, the SCSI mid-layer and the driver run in a guest kernel. Consequently, they do not have HW physical addresses, but only "virtual physical" addresses, and these addresses are used by the system and method of the present invention to program HCA translation tables through a restricted CQ associated with that domain. When the read operation comes from the disk, the HCA translates the virtual address received from the disk to this "virtual physical" address. In a next (second) step, it translates this "virtual physical" addresses to an HW address using the second translation hop. At this hop, it also validates that mapping of the "virtual physical" address to an HW address exists, and if yes, it performs the IO operation.

In case the second translation step fails, the HCA generates an event (interrupt) to Hypervisor ("traps with error"). Hypervisor can either allocate a new physical page to the domain and resume HCA operation, or shut down the guest domain. The former happens when the guest domain specified a valid "guest physical" address, but an HW page has not been allocated to it. The latter happens when the guest domain specified an invalid "guest physical" address, which could happen e.g. due to a virus or other SW "bug" in the guest. The latter is an example of why guests are not treated as "trusted" entities, this being a key value proposition of virtual servers.

In summary, the present system and method provide a number of new and novel features embodied in a smart IO device:
1. Ability to create multiple restricted CQs
2. Ability to associate (allocate) resources to these restricted CQs
3. Ability to configure which operations on these resources are allowed to be done directly by a guest on these CQs, and which operations need to be proxied to the Hypervisor. A particularly performance-critical operation that can be done directly from the guest is to program HCA translation tables.
4. Ability to associate address spaces (at present 128) with guest domains (each domain receiving its own address space) and to use them in the second hop of the address translation process.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for accelerating input/output (IO) access operation on a virtual machine running on a host computer that has IO resources, comprising the steps of:
   a. providing a smart IO device that includes an unrestricted command queue, a plurality of restricted command queues, each restricted command queue for configuring and controlling only a respective portion of the IO resources of the host computer, and a corresponding plurality of data queues separate from the restricted command queues;
   b. by a hypervisor, allocating the respective portion of the IO resources of one of the restricted command queues to a guest domain through the unrestricted command queue, and
   c. allowing the guest domain to directly configure and control the respective portion of the IO resources of the one restricted command queue through the one restricted command queue;
   wherein the step of allowing each guest domain to directly configure and control IO resources includes using a privileged virtual switching element to perform the allocation of IO resources through the unrestricted command queue and to export each restricted command queue to a respective guest domain;
   wherein the using a privileged virtual switching element to perform the allocation of IO resources includes using the privileged virtual switching element to allocate a particular address space to the respective guest domain, the address space being one of many supported by the smart IO device; and
   wherein the allocation of the particular address space to a respective guest domain includes using the allocated address space to translate a guest physical address into a hardware (HW) physical address.

2. The method of claim 1, wherein the exporting is performed during an event selected from the group consisting of booting the guest domain and hot plugging while the guest domain is running.

3. The method of claim 1, wherein the using a privileged virtual switching element includes using a hypervisor.

4. A method for accelerating input/output (I/O) access operation on a virtual machine running on a host computer that has IO resources, comprising the steps of:
   a. in a smart IO device, providing a plurality of restricted command queues, each restricted command queue for configuring and controlling only a respective portion of the IO resources of the host computer, each restricted command queue associated with a respective guest domain and a separate respective data queue; and
   b. using a hypervisor, allocating IO resources to each restricted command queue, whereby each guest domain may directly configure and control the respectively allocated IO resources of its associated restricted command queue while being isolated and protected from other guest domains;

wherein the step of allocating partial IO resources to each restricted command queue includes, for each guest domain, configuring a respective translation table located in the smart IO device through its respective restricted command queue; wherein the configuring a respective translation table includes configuring a table that translates a guest domain physical address into a hardware (HW) physical address, thereby enabling to enforce allocation of physical memory for IO accesses; and wherein the step of allocating partial IO resources to each restricted command queue includes, by the hypervisor, for each guest domain:
  i. allocating a physical address for the virtual machine,
  ii. providing the guest domain with a virtual physical address space,
  iii. setting up the respective smart IO device translation table operative to translate from the virtual physical address to the HW physical address.

5. The method of claim 4, wherein the providing a plurality of restricted command queues, each associated with a respective guest domain is performed by the hypervisor.

6. The method of claim 4, wherein the allocation of physical memory for IO accesses includes reallocation of physical memory between guest domains.

7. A method for accelerating input/output (IO) access operation on a virtual machine running on a host computer that has IO resources, comprising the steps of:
  a. providing a smart IO device that includes an unrestricted command queue and a plurality of restricted command queues, each restricted command queue for configuring and controlling only a respective portion of IO resources of the host computer;
  b. by a hypervisor, allocating the respective portion of the IO resources of one of the restricted command queues to a guest domain through the unrestricted command queue, and
  c. allowing the guest domain to directly configure and control the respective portion of the IO resources of the one restricted command queue through the one restricted command queue;

wherein the step of allowing each guest domain to directly configure and control IO resources includes using a privileged virtual switching element to perform the allocation of IO resources through the unrestricted command queue and to export each restricted command queue to a respective guest domain;

wherein the using a privileged virtual switching element to perform the allocation of IO resources includes using the privileged virtual switching element to allocate a particular address space to the respective guest domain, the address space being one of many supported by the smart IO device;

wherein the allocation of the particular address space to a respective guest domain includes using the allocated address space to translate a guest physical address into a hardware (HW) physical address; and wherein the allocation includes: by the privileged virtual switching element:
  i. booting a guest domain;
  ii. checking the HCA for additional restricted command queue support capability and existence of data resources to be associated with a specific command queue,
  iii. if such data resources are found, allocating respective data resources to each restricted command queue, and
  iv. initializing the respective data resources.

* * * * *